United States Patent [19]

Benedek

[11] Patent Number: 4,660,993
[45] Date of Patent: Apr. 28, 1987

[54] CALIBRATION WARNING DEVICE

[75] Inventor: Robin A. Benedek, London, England

[73] Assignee: Johnson Matthey Public Limited Cop., London, England

[21] Appl. No.: 768,836

[22] Filed: Aug. 23, 1985

[30] Foreign Application Priority Data

Aug. 23, 1984 [GB] United Kingdom ............... 8421451

[51] Int. Cl.$^4$ ............................................. G01K 19/00
[52] U.S. Cl. ............................................. 374/1; 73/1 R
[58] Field of Search ............... 374/1, 2, 3, 181; 73/1 R

[56] References Cited

U.S. PATENT DOCUMENTS

| 3,738,174 | 6/1973 | Waldron | 374/1 |
| 4,120,201 | 10/1978 | Wargo | 374/1 |
| 4,132,116 | 1/1979 | Zeeb | 374/1 |
| 4,377,346 | 3/1983 | Beaver et al. | 374/1 |
| 4,537,516 | 8/1985 | Epstein | 374/1 |

FOREIGN PATENT DOCUMENTS

| 3125883 | 2/1978 | Japan | 374/1 |
| 57-33332 | 2/1982 | Japan | 374/1 |
| 58-15853 | 9/1983 | Japan | 374/1 |
| 2136135 | 9/1984 | United Kingdom | 374/1 |

Primary Examiner—Charles Frankfort
Assistant Examiner—Thomas B. Will
Attorney, Agent, or Firm—Cushman, Darby & Cushman

[57] ABSTRACT

In a calibration warning device for a thermocouple, the thermocouple is connected to input terminals (10) of an operational amplifier (12) provided with negative feedback. The output is applied to the base of a transistor (14) controlling the current supplied to a mercury coulometer (18). When the coulometer indicator reaches full-scale deflection, the thermocouple is due to be recalibrated. The invention utilizes the face that the drift curve of a thermocouple can be matched to a sufficiently high accuracy by a suitable choice of transistor characteristic and amplifier gain, as is explained in the specification.

9 Claims, 5 Drawing Figures

CALIBRATION WARNING DEVICE

BACKGROUND OF THE INVENTION

The invention relates to a calibration warning device for thermocouples.

For many purposes, for instance, crystal growing, liquid melt epitaxy and semi-conductor diffusion processes, furnace temperatures must be measured and controlled to a high accuracy. Thermocouples used for prolonged periods at high temperatures are liable to calibration dirft and to maintain the necessary accuracy they must be recalibrated at intervals which depend on their exposure to high temperatures.

The present invention is aimed at providing a calibration warning device to indicate when such recalibration is necessary.

In our UK Patent application No. 2136135 a device for this purpose is proposed. It comprises an amplifier circuit of suitable characteristics causing current to flow through a coulometer, the thermocouple being due for recalibration when the coulometer reading reaches it full-scale deflection.

SUMMARY OF THE INVENTION

The present invention provides a similar warning device of improved accuracy and reliability and capable of a more compact construction.

The invention is defined in the claims appended hereto. It depends on the fact as will be explained below, that the curve relating rate of thermocouple drift from calibration with temperature for a thermocouple is roughly exponential in form, and may be approximated to a satisfactorily high accuracy by an analog current generated by a linear amplifier coupled to a suitably-chosen transistor.

BRIEF DESCRIPTION OF THE DRAWINGS

The invention will be further described by way of example with reference to the accompanying drawings, in which.

DETAILED DESCRIPTION OF THE PREFERRED EMBODIMENT

Figure 1:
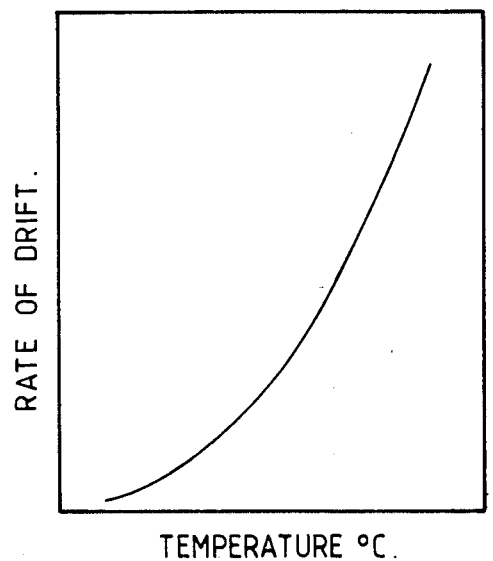
FIGS. 1, 2, 3 and 5 are graphs relevant to the theory of the invention.

FIG. 1 shows schematically the form of a graph relating the rate of drift of a thermocouple to its operating temperature. Such a curve is of course determined experimentally for each type of thermocouple.

Figure 2:
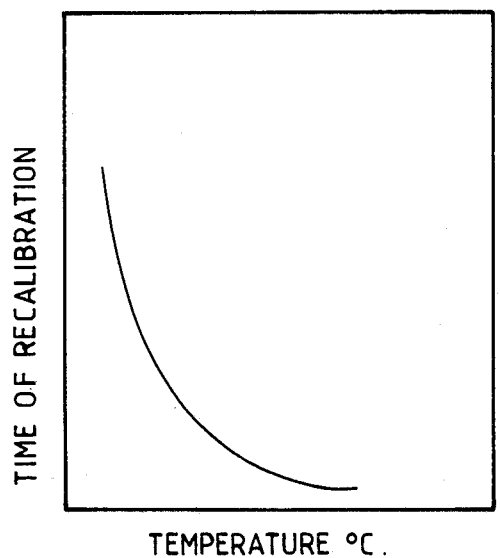

Taking, for example, 1° C. as a maximum tolerable drift, then the time interval before the thermocouple requires recalibration can be determined directly from FIG. 1. This varies as shown in FIG. 2.

Figure 3:
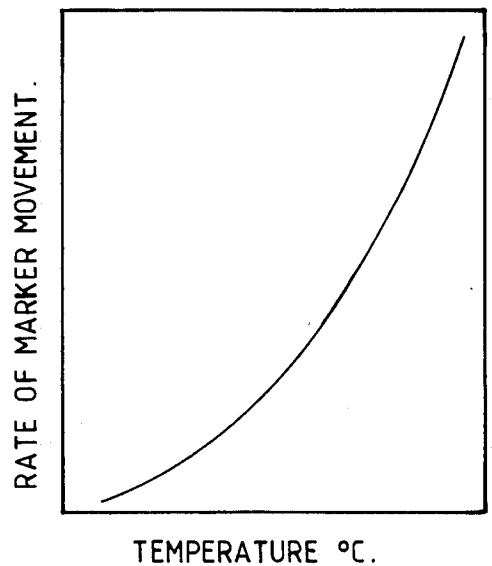

The circuit of the invention, as will be described below, drives an indicator whose marker reaches full-scale deflection when the thermocouple is due for recalibration. The rate of marker movement to achieve this, for each particular thermocouple temperature, is shown in FIG. 3, and this curve is, of course, a suitably scaled version of the curve of FIG. 1.

Figure 4:
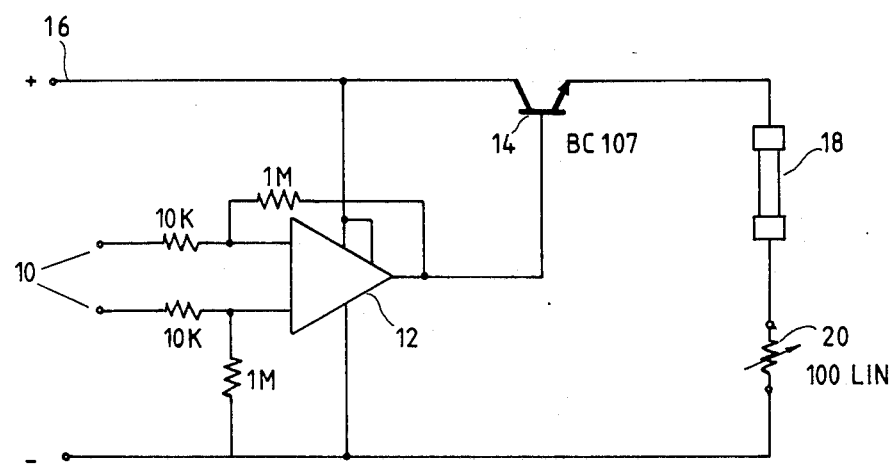
FIG. 4 is a circuit diagram of the invention.

FIG. 4 is a circuit diagram of the warning device of the present invention. The thermocouple is connected to a pair of terminals 10 which in turn are connected to the differential input of an amplifier 12 through a pair of input resistors. The amplifier 12 comprises a CMOS operational amplifier type No. TLC271 manufactured by Texas Instruments Inc., provided with feedback resistors, and the output of this amplifier is applied to the base of a series pass transistor 14 type No. BC107 controlling the current through a coulometer 18, in series with a variable resistor 20 of 100,000 ohms max. The circuit is powered by a battery (not shown) connected between the terminals 16.

The operation of the circuit will now be described referring now also to FIG. 5.

At room temperature the output from the differential amplifier 12 is nil, and the transistor is in the "off" condition, no current flowing through the coulometer 18. As the temperature rises the voltage from the amplifier 12 biasses the transistor 14 so that it passes a progressively increasing current corresponding to the dotted threshold portion B of the curve shown in FIG. 5.

When the temperature reaches about 400° C. the curve becomes linear, as shown at C. It will be noted that the combined curve lies always above the curve of FIG. 3 for the required rate of marker movement, which has been plotted on FIG. 5 for comparison. There is thus always a small safety margin E between the curves, which ensures that the time indicated for re-calibration is never over estimated.

Figure 5:
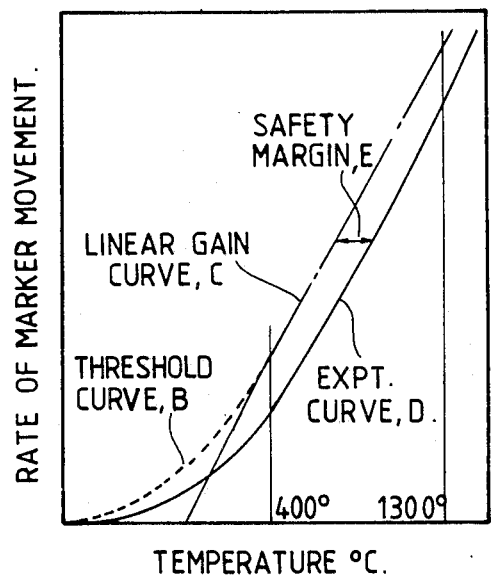

In selecting the circuit components it should be noted that the gain of the amplifier 12, which is set by the feedback resistors and input resistors, determines the slope of the linear portion C of the curve of FIG. 5. The choice of transistor 14 determines the shape of the threshold curve B, and the setting of the variable resistor 20 provides a scaling factor for the time to full scale deflection. The component values given are suitable for type R and S thermocouples.

The coulometer 18 is a mercury 'time elapsed' indicator, stock No. 258-164 available from RS Components Ltd. Full-scale deflection of the indicator corresponds to a total charge of 6.77 mA. hr. Resistor valves are as indicated in FIG. 4. The circuit is driven from a 5.6 v battery and has a quiescent current of five microamperes. The low current consumption allows the device to be permanently connected to its battery.

I claim:

1. Apparatus adapted for indicating when a thermocouple requires calibration, comprising:
   current supply means adapted for supplying a current to said apparatus;
   coulometer means having an indicator, for indicating that said thermocouple requires calibration;
   amplifier means, adapted to be coupled to said thermocouple, for outputting a signal when said thermocouple exceeds a predetermined temperature;
   transistor means, coupled to said amplifier means and said current supply means, for passing current from said current supply means to said coulometer means in response to said signal from said amplifier means to move said coulometer indicator, whereby said coloumeter means indicates that said thermocouple requires calibration when said coloumeter indicator has been moved to a predetermined position.

2. Apparatus according to claim 1 wherein said amplifier means has a substantially linear voltage gain.

3. Apparatus according to claim 1 wherein said predetermined temperature is ambient temperature.

4. Apparatus according to claim 1 wherein said amplifier means signal corresponds with the thermocouple temperature.

5. Apparatus according to claim 4 wherein said transistor means passes an amount of current corresponding to said thermocouple temperature.

6. Apparatus according to claim 5 wherein the amount of current said transistor means passes varies curvelinearly with said thermocouple temperature up to a predesignated temperature, and varies linearly with said thermocouple temperature above said predesignated temperature.

7. Apparatus according to claim 1 wherein said coulometer means includes a mercury, time-elapsed indicator.

8. Apparatus according to claim 1 wherein said amplifier means includes a CMOS operational amplifier having a high input impedence.

9. Apparatus according to claim 1 wherein said current supply means includes a battery.

* * * * *